(12) United States Patent
Nicke et al.

(10) Patent No.: US 10,816,666 B2
(45) Date of Patent: Oct. 27, 2020

(54) VEHICLE SENSING SYSTEM WITH CALIBRATION/FUSION OF POINT CLOUD PARTITIONS

(71) Applicant: Magna Electronics Inc., Auburn Hills, MI (US)

(72) Inventors: Peter Nicke, Boeblingen (DE); Benjamin May, Lübs (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 112 days.

(21) Appl. No.: 16/197,484

(22) Filed: Nov. 21, 2018

(65) Prior Publication Data

US 2019/0154833 A1 May 23, 2019

Related U.S. Application Data

(60) Provisional application No. 62/589,122, filed on Nov. 21, 2017.

(51) Int. Cl.
| | | |
|---|---|---|
| *G01S 17/87* | (2020.01) | |
| *G01S 17/89* | (2020.01) | |
| *G01S 17/86* | (2020.01) | |
| *G01S 17/931* | (2020.01) | |

(52) U.S. Cl.
CPC ............ *G01S 17/87* (2013.01); *G01S 17/86* (2020.01); *G01S 17/89* (2013.01); *G01S 17/931* (2020.01); *G06T 2207/10028* (2013.01)

(58) Field of Classification Search
CPC .......... G01S 17/86; G01S 17/87; G01S 17/89; G01S 17/931; G06T 2207/10028

USPC .......................................................... 701/300
See application file for complete search history.

(56) References Cited

U.S. PATENT DOCUMENTS

| | | | |
|---|---|---|---|
| 5,949,331 | A | 9/1999 | Schofield et al. |
| 6,587,186 | B2 | 7/2003 | Bamji et al. |
| 6,674,895 | B2 | 1/2004 | Rafii et al. |
| 6,678,039 | B2 | 1/2004 | Charbon |
| 6,690,354 | B2 | 2/2004 | Sze |
| 6,710,770 | B2 | 3/2004 | Tomasi et al. |
| 6,825,455 | B1 | 11/2004 | Schwarte |
| 6,876,775 | B2 | 4/2005 | Torunoglu |
| 6,906,793 | B2 | 6/2005 | Bamji et al. |
| 6,919,549 | B2 | 7/2005 | Bamji et al. |
| 7,053,357 | B2 | 5/2006 | Schwarte |
| 7,157,685 | B2 | 1/2007 | Bamji et al. |
| 7,176,438 | B2 | 2/2007 | Bamji et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |

(Continued)

FOREIGN PATENT DOCUMENTS

WO 2011090484 A1 7/2011

*Primary Examiner* — Atul Trivedi
(74) *Attorney, Agent, or Firm* — Honigman LLP

(57) ABSTRACT

A lidar sensing system for a vehicle includes a plurality of lidar sensor modules disposed at a vehicle, with each lidar sensor module having a laser unit and a sensor unit, and with each lidar sensor module having a respective field of sensing exterior of the vehicle. Each field of sensing is different from the other fields of sensing and partially overlaps at least one other field of sensing. An output of each lidar sensor module is communicated to a control, and the control, responsive to outputs from the lidar sensor modules, determines a combined field of sensing.

20 Claims, 2 Drawing Sheets

(56) References Cited

U.S. PATENT DOCUMENTS

| | | |
|---|---|---|
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 2010/0245066 A1 | 9/2010 | Sarioglu et al. |
| 2011/0164783 A1* | 7/2011 | Hays ............... G01S 17/003 382/100 |
| 2013/0155723 A1* | 6/2013 | Coleman ........... G02B 6/0018 362/621 |
| 2015/0131080 A1* | 5/2015 | Retterath .......... G01S 17/93 356/5.01 |
| 2016/0327636 A1* | 11/2016 | Gazit ............... G01S 7/4972 |
| 2017/0176575 A1* | 6/2017 | Smits ............... G01S 7/484 |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0307736 A1* | 10/2017 | Donovan ........... G01S 17/89 |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0222450 A1 | 8/2018 | Kunze |
| 2018/0231635 A1 | 8/2018 | Woehlte |
| 2018/0284275 A1* | 10/2018 | LaChapelle ........ G01S 7/4861 |
| 2018/0284279 A1* | 10/2018 | Campbell .......... G01S 7/4812 |
| 2018/0284286 A1* | 10/2018 | Eichenholz ........ G01S 17/10 |
| 2018/0299534 A1* | 10/2018 | LaChapelle ........ G01S 7/4817 |
| 2019/0011541 A1* | 1/2019 | O'Keeffe .......... G01S 17/10 |
| 2019/0072649 A1* | 3/2019 | Droz ............... G01S 17/89 |
| 2019/0146066 A1 | 5/2019 | Kunze |
| 2019/0154816 A1* | 5/2019 | Hughes ............. G05D 1/0061 |
| 2019/0271767 A1* | 9/2019 | Keilaf ............. G01S 7/489 |
| 2019/0339382 A1 | 11/2019 | Hess et al. |
| 2019/0353784 A1* | 11/2019 | Toledano .......... G01S 17/86 |
| 2019/0361126 A1* | 11/2019 | Abari ............. G01S 17/86 |
| 2020/0142068 A1* | 5/2020 | Crouch ............ G01S 17/42 |
| 2020/0142073 A1* | 5/2020 | Gassend ........... G01S 17/89 |
| 2020/0166617 A1* | 5/2020 | Crouch ............ G01S 7/4914 |
| 2020/0166647 A1* | 5/2020 | Crouch ............ G01S 7/32 |

* cited by examiner

FIG. 2B
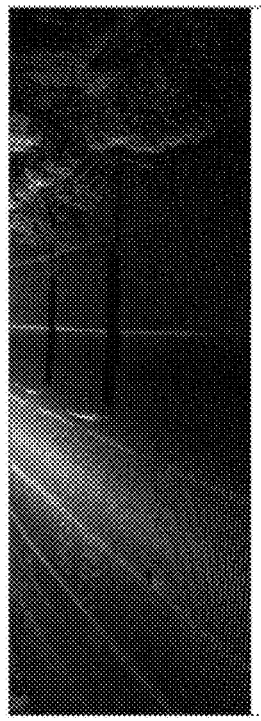
FIG. 2A
FIG. 2C
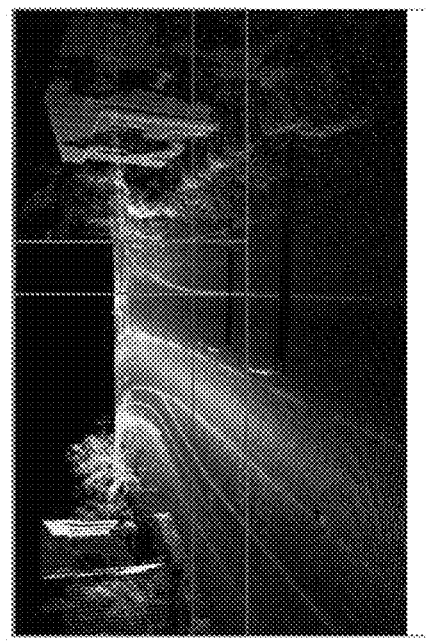
FIG. 2D

VEHICLE SENSING SYSTEM WITH CALIBRATION/FUSION OF POINT CLOUD PARTITIONS

CROSS REFERENCE TO RELATED APPLICATION

The present application claims the filing benefits of U.S. provisional application Ser. No. 62/589,122, filed Nov. 21, 2017, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a plurality of lidar sensor modules, each disposed at the vehicle to sense a respective region exterior of the vehicle. Each lidar sensor module includes a laser unit and a sensor unit. Each lidar sensor module has a field of sensing that is different than the other fields of sensing and partially overlaps at least one other field of sensing. The sensing system also includes a control that receives outputs from each lidar sensor module, and in response to these outputs, determines a combined field of sensing.

Each laser unit may transmit a pattern in overlap areas that is different from patterns transmitted in a non-overlap area. The patterns may be different by altering a laser energy output transmitted by the laser units. Each lidar sensor may be operable to detect pattern differences between the overlap areas and the non-overlap areas and the control may be operable to spatially synchronize the outputs of the lidar sensor modules based at least in part on the overlap and non-overlap patterns.

These and other objects, advantages, purposes and features of the present invention will become apparent upon review of the following specification in conjunction with the drawings.

BRIEF DESCRIPTION OF THE DRAWINGS

FIGS. 2A-2D are a graphical representation of a combined field of sensing generated by the lidar sensing system shown in FIG. 1.

DESCRIPTION OF THE PREFERRED EMBODIMENTS

Figure 1:
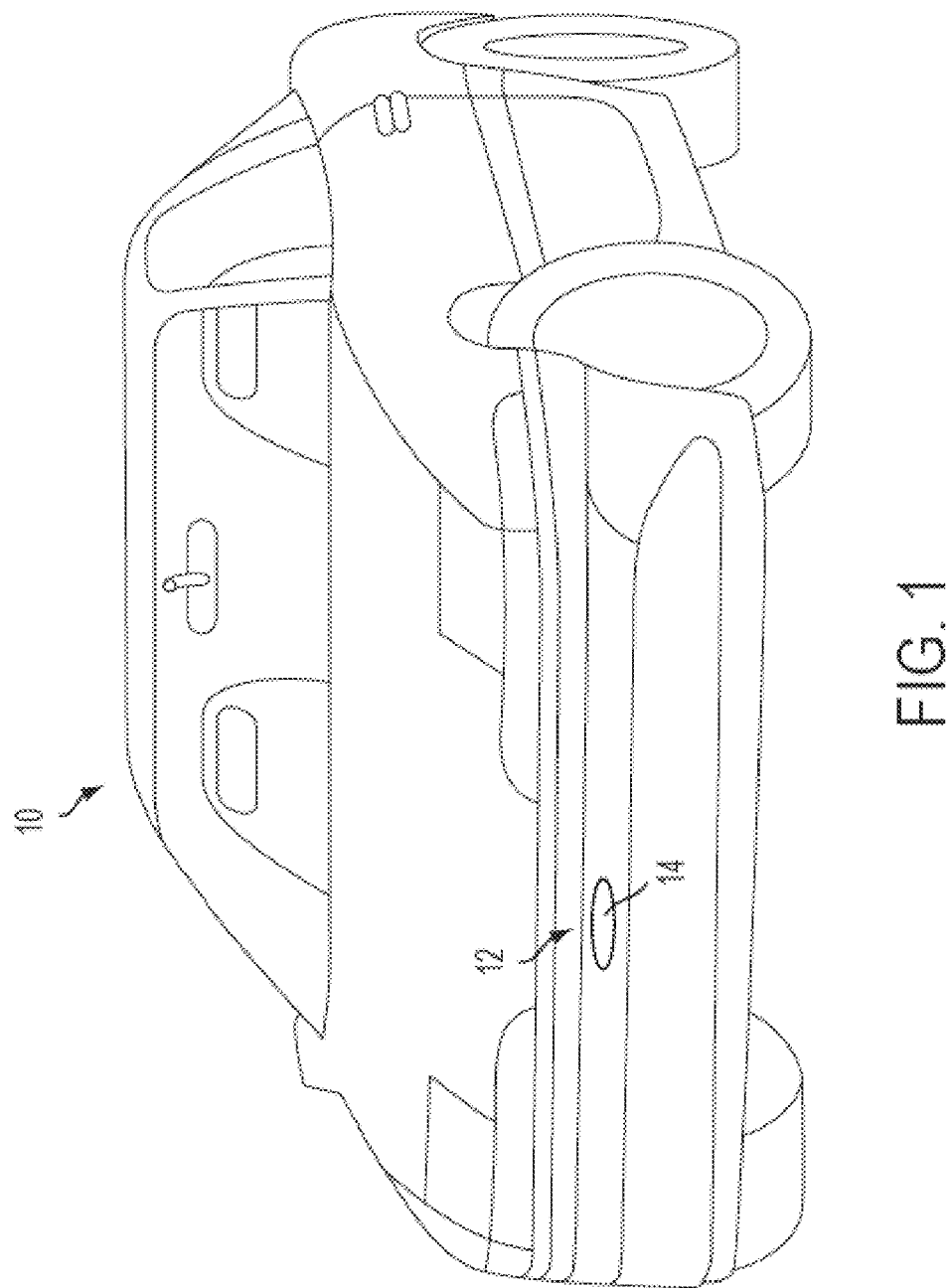
FIG. 1 is a perspective view of a vehicle with a sensing system that incorporates a lidar sensor module in accordance with the present invention.

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space (or to assist an autonomous vehicle control in controlling the vehicle autonomously or semi-autonomously). The system includes a control that is operable to receive sensing data from multiple sensors and, responsive to the sensing data, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle), or controls one or more vehicle systems.

Referring now to the drawings and the illustrative embodiments depicted therein, a vehicle 10 includes a lidar sensing system 12 (also known as LIDAR, LiDAR, and Lidar) that includes a plurality of lidar sensor modules or units such as a forward facing lidar sensor module or unit 14 (and other optional placement, such as a rearward facing sensor at the rear of the vehicle, and a sideward/rearward facing sensor at respective sides of the vehicle), which sense regions exterior of the vehicle (FIG. 1). The sensing system 12 includes a control or electronic control unit (ECU) or processor that is operable to process data captured by the sensors and may detect objects or the like. The data transfer or signal communication from the sensor to the ECU may comprise any suitable data or communication link, such as a vehicle network bus or the like of the equipped vehicle. The lidar sensor module 14 and system 12 may utilize aspects of the sensing modules and systems described in U.S. Publication No. US-2018-0222450, which is hereby incorporated herein by reference in its entirety.

The automotive lidar sensor modules 14 of the present invention are configured to be mounted outside of the vehicle for detecting the environmental scene. A preferred location for these lidar sensor modules 14 to mount is within the bumpers and viewing or sensing outwardly. Generally, every design element at or in which a lidar sensor can be hidden and has an effectual view opening is optionally a place for mounting a lidar sensor, such as at the front grill, the head lights, the daytime running lights, a blinker, the license plate illumination, the tire housings, the vehicle emblem, the trunk lid opener handle, the door handles, the rearview mirrors or wing elements with rear view cameras at the place where usually the rearview mirrors were, the rooftop bars, the roof top antenna fins or the spoiler or the like.

It is often advantageous to have a field of sensing that is wider than an individual sensor module 14 can provide. For example, a 360 degree field of sensing may be desired. To achieve a 360 field of sensing, three sensor modules with a field of sensing of 120 degrees may be used. However, for reasons such as mounting tolerances, this may lead to gaps or mismatches in the combined field of sensing. Therefore, sensor modules 14 with a wider field of sensing can be used, causing an overlap in the fields of sensing. It is then necessary to accurately "stitch" the overlapping fields of sensing together to determine a combined field of sensing. This allows the field of sensing of multiple sensor modules 14 (FIGS. 2A-2C) to be combined both spatially and temporally into a single field of sensing (FIG. 2D).

In accordance with the present invention, each lidar sensor module 14 comprises a laser unit or laser generator or laser light source and a sensor unit or sensor and each module 14 is disposed at a vehicle 10 in such a way to give each module 14 a respective field of sensing exterior of the vehicle 10. Each field of sensing is different from one another and partially overlaps at least one other field of sensing. The overlap may be any amount, but a minimal overlap is optimal. For example, the overlap may be just enough to overcome mounting tolerances. Each laser unit outputs a pulsed laser light that is reflected by a target. As the target reflects the laser light back toward system 12, each respective sensor unit measures the reflected pulse from its associated laser unit.

Sensing system 12 also includes a control. The control communicates with each lidar sensor module 14 and receives data output from the modules. The data output includes the measured reflected pulses. Differences in return times and wavelengths can be used to generate a three dimensional (3D) point cloud of the target. Responsive to these outputs, the control determines a combined field of sensing. Point clouds generated by separate sensor modules may be fused together by different region-of-interests (ROIs) or subareas. These subareas are stitched together to cover the entire field of sensing. Each subarea is typically generated by an independent sensor module 14. When being stitched, it is desirous that the subareas be stitched accurately temporally and spatially.

To this end, each laser unit that transmits in an overlap area may transmit a pattern of pulsed laser light that is different than each other pattern transmitted in the overlap area by other laser units. That is, for example, if two fields of sensing generated by two laser units has one overlap area between them, each laser may transmit a unique pattern in the overlap area. A laser unit may transmit the same pattern in overlap areas and non-overlap areas or transmit different patterns in overlap areas versus non-overlap areas. The laser units may alter the pattern in any number of ways. For example, the laser units may alter a laser energy level of the transmitted laser light. Each sensor unit may be operable to detect pattern differences between the overlap areas and the non-overlap areas. Alternatively, the control may be operable to determine differences in the patterns. The control may determine a degree of misalignment of a lidar sensor module relative to another lidar sensor module based on the detected pattern differences. That is, the control may determine an amount of actual overlap between the fields of sensing of the lidar sensor modules.

The control may be operable to determine, based at least on the detected patterns, an alignment marker (e.g., at the border between the overlap and non-overlap area). With such an alignment marker, in conjunction with computer vision analysis of subpictures and reordering of the subareas and other intelligent algorithms, the lidar data representative of the field of sensing of each sensor module 14 may be spatially synchronized and combined. In some examples, a laser unit detects the alignment marker of another laser unit and adjusts its field of sensing accordingly by mapping its overlap area with the other laser unit's overlap area. The control may determine a failure when the stitching fails, and report a failed framed to the system 12. In this way, the overlap area can be minimized, as the control can accurately stitch the fields of sensing without requiring a large overlap area.

For example, a first laser unit may transmit a pattern "A" and a second laser unit may transmit a pattern "B", with the patterns being different from one another and overlapping at an overlap area or region. The second laser unit detects the pattern A and can align its position via detection and processing of the received pattern A reflections. Optionally, the system or second laser unit can map the pattern "A" with its pattern "B" to determine alignment of the second laser unit relative to the first laser unit. The system thus is operable to determine the alignment of one laser unit relative to another via processing of a pattern transmitted by the other laser unit at an area where the first laser unit senses.

The system thus calibrates and combines the sensor information in a way that the Lidar sensors fit together at the borders of the fields of sensing. With a minimum overlap area of the different sensors, a special pattern can be projected by the Lidar (e.g., by adapting the laser energy pixel wise), and the special pattern can be recognized by both sensors. The system or processor processes data captured by the sensors and spatially synchronizes the data.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, and/or U.S. patent application Ser. No. 16/190,201, filed Nov. 14, 2018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A lidar sensing system for a vehicle, said lidar sensing system comprising:

a plurality of lidar sensor modules disposed at a vehicle equipped with said lidar sensing system, wherein the plurality of lidar sensor modules comprises at least a first lidar sensor module and a second lidar sensor module;

wherein the first lidar sensor module projects a first laser-generated pattern of light and senses light reflected off of objects in a first field of sensing of the first lidar sensor module;

wherein the second lidar sensor module projects a second laser-generated pattern of light and senses light reflected off of objects in a second field of sensing of the second lidar sensor module;

wherein the first and second fields of sensing of the first and second lidar sensor modules are different, and wherein the first field of sensing of the first lidar sensor module partially overlaps the second field of sensing of the second lidar sensor module at an overlap area;

a control including a data processor, wherein an output of each of the first and second lidar sensor modules is communicated to the control for processing at the control; and wherein the control, responsive to processing at the control of the outputs of both of the first and second lidar sensor modules, determines a degree of misalignment of the second lidar sensor module relative to the first lidar sensor module based on comparison between (i) light sensed by the first lidar sensor module that is reflected off of objects in the overlap area when the first laser-generated pattern of light is projected by the first lidar sensor module and (ii) light sensed by the second lidar sensor module that is reflected off of objects in the overlap area when the second laser-generated pattern of light is projected by the second lidar sensor module.

2. The lidar sensing system of claim 1, wherein each of the first and second lidar sensor modules comprises a laser unit that projects the respective laser-generated pattern of light and a sensor unit that senses the light reflected off of objects in the respective field of sensing.

3. The lidar sensing system of claim 2, wherein the laser unit of the first lidar sensor module projects the first laser-generated pattern of light in the overlap area that is different than the second laser-generated pattern of light projected in the overlap area by the second lidar sensor module.

4. The lidar sensing system of claim 2, wherein the laser unit of the first lidar sensor module and the second lidar sensor module project different laser-generated patterns of light in the overlap area by altering a laser energy.

5. The lidar sensing system of claim 2, wherein the laser unit of the first lidar sensor module projects a laser-generated pattern of light in the overlap area that is different than the laser-generated pattern of light projected by that laser unit in another area of the first field of sensing of the first lidar sensor module.

6. The lidar sensing system of claim 1, wherein said lidar sensing system, via processing at the control of outputs from the first and second lidar sensor modules, determine pattern differences projected by each of the first and second lidar sensor modules.

7. The lidar sensing system of claim 6, wherein the control, via processing at the control of outputs from the first and second lidar sensor modules, spatially synchronizes the outputs from the first and second lidar sensor modules based at least in part on the determined pattern differences at the overlap area.

8. The lidar sensing system of claim 6, wherein the control, based at least in part on the determined pattern differences, determines an alignment marker between the overlap and non-overlap areas.

9. The lidar sensing system of claim 8, wherein the control determines a combined field of sensing via processing at the control of each output and of each alignment marker.

10. The lidar sensing system of claim 9, wherein the control reports a failed frame when determining the combined field of sensing fails.

11. The lidar sensing system of claim 1, comprising a third lidar sensor module that has a field of sensing that overlaps the field of sensing of the second lidar sensor module, wherein each of the first, second and third lidar sensor modules has a field of sensing greater than 120 degrees.

12. The lidar sensing system of claim 1, wherein the first field of sensing of the first lidar sensor module partially overlaps the second field of sensing of the second lidar sensor module by an amount that is equivalent to mounting tolerances of the first and second lidar sensor modules.

13. A lidar sensing system for a vehicle, said lidar sensing system comprising:

a plurality of lidar sensor modules disposed at a vehicle equipped with said lidar sensing system, wherein the plurality of lidar sensor modules comprises at least a first lidar sensor module and a second lidar sensor module;

wherein the first lidar sensor module projects a first laser-generated pattern of light and senses light reflected off of objects in a first field of sensing of the first lidar sensor module;

wherein the second lidar sensor module projects a second laser-generated pattern of light and senses light reflected off of objects in a second field of sensing of the second lidar sensor module;

wherein each of the first and second lidar sensor modules comprises a laser unit that projects the respective laser-generated pattern of light and a sensor unit that senses the light reflected off of objects in the respective field of sensing;

wherein the first and second fields of sensing of the first and second lidar sensor modules are different, and wherein the first field of sensing of the first lidar sensor module partially overlaps the second field of sensing of the second lidar sensor module at an overlap area;

wherein the laser unit of the first lidar sensor module projects the first laser-generated pattern of light in the overlap area that is different than the second laser-generated pattern of light projected in the overlap area by the second lidar sensor module;

wherein the laser unit of the first lidar sensor module and the second lidar sensor module project different laser-generated patterns of light in the overlap area by altering a laser energy;

a control including a data processor, wherein an output of each of the first and second lidar sensor modules is communicated to the control for processing at the control; and wherein the control, responsive to processing at the control of the outputs of both of the first and second lidar sensor modules, determines a degree of misalignment of the second lidar sensor module relative to the first lidar sensor module based on comparison between (i) light sensed by the first lidar sensor module that is reflected off of objects in the overlap area when the first laser-generated pattern of light is projected by the first lidar sensor module and (ii) light sensed by the second lidar sensor module that is reflected off of objects in the overlap area when the second laser-generated pattern of light is projected by the second lidar sensor module.

14. The lidar sensing system of claim 13, wherein the laser unit of the first lidar sensor module projects a laser-generated pattern of light in the overlap area that is different than the laser-generated pattern of light projected by that laser unit in another area of the first field of sensing of the first lidar sensor module.

15. The lidar sensing system of claim 13, wherein said lidar sensing system, via processing at the control of outputs from the first and second lidar sensor modules, determine pattern differences projected by each of the first and second lidar sensor modules.

16. The lidar sensing system of claim 15, wherein the control, via processing at the control of outputs from the first and second lidar sensor modules, spatially synchronizes the outputs from the first and second lidar sensor modules based at least in part on the determined pattern differences at the overlap area.

17. The lidar sensing system of claim 15, wherein the control, based at least in part on the determined pattern differences, determines an alignment marker between the overlap and non-overlap areas.

18. A lidar sensing system for a vehicle, said lidar sensing system comprising:

a plurality of lidar sensor modules disposed at a vehicle equipped with said lidar sensing system, wherein the plurality of lidar sensor modules comprises at least a first lidar sensor module and a second lidar sensor module;

wherein the first lidar sensor module projects a first laser-generated pattern of light and senses light reflected off of objects in a first field of sensing of the first lidar sensor module;

wherein the second lidar sensor module projects a second laser-generated pattern of light and senses light reflected off of objects in a second field of sensing of the second lidar sensor module;

wherein the first and second fields of sensing of the first and second lidar sensor modules are different, and wherein the first field of sensing of the first lidar sensor module partially overlaps the second field of sensing of the second lidar sensor module at an overlap area;

wherein the first field of sensing of the first lidar sensor module partially overlaps the second field of sensing of the second lidar sensor module by an amount that is equivalent to mounting tolerances of the first and second lidar sensor modules;

wherein each of the first and second lidar sensor modules comprises a laser unit that projects the respective laser-generated pattern of light and a sensor unit that senses the light reflected off of objects in the respective field of sensing wherein the laser unit of the first lidar sensor module and the second lidar sensor module project different laser-generated patterns of light in the overlap area by altering a laser energy;

a control including a data processor, wherein an output of each of the first and second lidar sensor modules is communicated to the control for processing at the control; and wherein the control, responsive to processing at the control of the outputs of both of the first and second lidar sensor modules, determines a degree of misalignment of the second lidar sensor module relative to the first lidar sensor module based on comparison between (i) light sensed by the first lidar sensor module that is reflected off of objects in the overlap area when the first laser-generated pattern of light is projected by the first lidar sensor module and (ii) light sensed by the second lidar sensor module that is reflected off of objects in the overlap area when the second laser-generated pattern of light is projected by the second lidar sensor module.

19. The lidar sensing system of claim 18, wherein said lidar sensing system, via processing at the control of outputs from the first and second lidar sensor modules, determine pattern differences projected by each of the first and second lidar sensor modules.

20. The lidar sensing system of claim 19, wherein the control, based at least in part on the determined pattern differences, determines an alignment marker between the overlap and non-overlap areas.

\* \* \* \* \*